(12) United States Patent
Yang

(10) Patent No.: US 6,628,368 B2
(45) Date of Patent: Sep. 30, 2003

(54) LIQUID CRYSTAL DISPLAY CAPABLE OF BEING REPAIRED FOR DEFECTS IN DATA LINES AND METHOD FOR REPAIRING THE SAME

(75) Inventor: Jenn-Fang Yang, Taichung (TW)

(73) Assignee: Chi Mei Optoelectronics Corp. (TW)

( * ) Notice: Subject to any disclaimer, the term of this patent is extended or adjusted under 35 U.S.C. 154(b) by 6 days.

(21) Appl. No.: 10/068,872

(22) Filed: Feb. 11, 2002

(65) Prior Publication Data

US 2002/0118316 A1 Aug. 29, 2002

(30) Foreign Application Priority Data

Feb. 23, 2001 (TW) ........................................ 90104273 A

(51) Int. Cl.[7] .......................... G02F 1/13; G02F 1/1343; G02F 1/136
(52) U.S. Cl. ........................... 349/192; 349/38; 349/39; 349/43; 349/187
(58) Field of Search .............................. 349/38, 39, 43, 349/192, 187, 40

(56) References Cited

U.S. PATENT DOCUMENTS

| | | | | |
|---|---|---|---|---|
| 5,337,173 A | * | 8/1994 | Atsumi et al. | ................. 349/39 |
| 5,691,786 A | * | 11/1997 | Nakai | ........................... 349/39 |
| 5,995,178 A | * | 11/1999 | Fujikawa et al. | ............. 349/55 |
| 6,100,948 A | * | 8/2000 | Kim et al. | ..................... 349/39 |

* cited by examiner

Primary Examiner—Tarifur R. Chowdhury
Assistant Examiner—Ruth Groden
(74) Attorney, Agent, or Firm—Rabin & Berdo, P.C.

(57) ABSTRACT

A liquid crystal display capable of being repaired for defects in data lines and method for repairing the same. The liquid crystal display includes multiple scan lines, multiple data lines, multiple transparent pixel electrodes, multiple switching devices, multiple first storage capacitors, multiple second storage capacitors, multiple first ring-type conductors, and multiple second ring-type conductors. Each of the first ring-type conductors and an associated one of the second ring-type conductors correspond to two adjacent scan lines and one of the data lines, wherein the first and second ring-type conductors are electrically connected. Through the connections of the first and second ring-type conductors and the storage capacitors, the pixels and the data lines can be repaired so that the problems due to malfunctioned storage capacitors and disconnection of the data lines can be resolved.

17 Claims, 7 Drawing Sheets

LIQUID CRYSTAL DISPLAY CAPABLE OF BEING REPAIRED FOR DEFECTS IN DATA LINES AND METHOD FOR REPAIRING THE SAME

This application incorporates by reference of Taiwan application Serial No. 90104273, filed on Feb. 23, 2001.

BACKGROUND OF THE INVENTION

1. Field of the Invention

The invention relates in general to a liquid crystal display (LCD) capable of being repaired and method for repairing the same, and more particularly to a LCD capable of being repaired for detects in data lines and method for the same.

2. Description of the Related Art

Liquid crystal displays are widely used because of having low radiation and compactness. For high-end products, thin film transistor LCDs (TFT-LCDs) are employed due to high brightness and wide view angles. In order to make products more competitive, manufacturers make efforts in the increase in yields and the reduction in cost.

A conventional TFT-LCD has a front plate and a rear plate. The front plate includes a number of transparent pixel electrodes, color filters, and black matrices. The rear plate includes a number of scan lines, data lines, storage capacitors, switching elements (e.g., TFTs), and transparent pixel electrodes.

FIG. 1 illustrates a pixel layout of a conventional TFT-LCD. The TFT-LCD has a number of scan lines 102 and data lines 104 perpendicularly intersecting the scan lines 102, thus forming a number of pixel regions. Each of the pixel regions is defined by a corresponding scan line and data line. Each pixel region includes a storage capacitor Cs, a TFT, and a transparent pixel electrode 106. The TFT is formed with a drain electrode G, a drain electrode D, and a source electrode S, and a channel 110. The scan lines 102 are connected to the gate electrodes of the TFTs while the data lines 104 are connected to the drain electrodes of the TFTs. The transparent pixel electrode 106 is coupled to the source electrode of the corresponding TFT.

FIG. 2 is a cross-sectional view taken along line AA' of FIG. 1. Referring to FIGS. 1 and 2, a conventional method for manufacturing a TFT is described below.

First, after a plate 202 is provided, a first metal layer is formed and then patterned to form a gate electrode G. Next, an isolation layer 204 is formed on the plate 202 and is used to cover the gate electrode G. An amorphous-Si (a-Si) layer is formed on the isolation layer 204 and then patterned to form the channel 110. After that, a second metal layer is formed, covering the channel 110 and the isolation layer 204. By performing a photolithography process on the second metal layer, the drain electrode D and the source electrode S are formed. Next, a protection layer 206 is formed on the drain electrode D and source electrode S so as to cover the isolation layer 204. The contact 108 is then formed within the protection layer 206, thus causing the protection layer 206 to expose the source electrode S through the contact 108. Finally, the transparent pixel electrode 106 is formed over the protection layer 206 and fills the contact 108 so that the transparent pixel electrode 106 is electrically coupled to the source electrode S.

The scan lines 102 and data lines 104 are respectively formed during the patterning of the gate and the source/drain (S/D) electrodes. The isolation layer 204 is used to separate the scan lines 102 and data lines 104.

FIG. 3 is a cross-sectional view taken along line BB' of FIG. 1. With reference to FIGS. 1, 2, and 3, a conventional method for manufacturing a storage capacitor is described below.

A storage capacitor Cs is formed with a common electrode 112 and a capacitor electrode 114 while the common electrode 112 and capacitor electrode 114 are separated by the isolation layer 204. The storage capacitor Cs is formed together with the formation of the TFT. The common electrode 112 is formed after the formation and patterning of the first metal layer. Likewise, after the formation and patterning of the second metal layer, the capacitor electrode 114 is formed. The protection layer 206 covers the capacitor electrode 114 and the isolation layer 204. A contact 116 is formed within the protection layer 206. When the transparent pixel electrode 106 is formed over the protection layer 206, the transparent pixel electrode 106 and the capacitor electrode 114 are electrically coupled through the contact 116. In addition, storage capacitors of all pixels of the TFT-LCD have their common electrodes connected to a common voltage of the TFT-LCD.

Unfortunately, defects may occur during the manufacturing of the common electrodes of the storage capacitors Cs and thus degrade the quality of the TFT-LCD. For example, when cracks or undesired particles occur on the plate 202, the common electrode 112 is formed with defects. In the worst case, the common electrode 112 may be disconnected due to serious defects. In additional, the common electrodes of all the storage capacitors Cs are coupled to the respective scan lines 102. Therefore, when disconnection occurs in one of the common electrodes, such as the common electrode 112, the other common electrodes that share the identical scan line with the common electrode 112 would have their signal path opened so that their associated storage capacitors cannot operate. In another case, defects that occur in the isolation layer 204 of the storage capacitor Cs due to undesired particles on the plate 202 during the manufacturing process may result in the capacitor electrode 114 and the common electrode 112 short-circuited. If the two electrodes are short-circuited, a signal on one scan line associated with the short circuit will interfere with the common electrodes on the scan line and the storage capacitors Cs on the same scan line cannot operate properly.

A conventional approach to solving the problems due to the defects is to break the connection of the TFT and the transparent pixel electrode of a pixel having a malfunctioned storage capacitor Cs so as to prevent the short-circuited common electrode 112 from affecting the other storage capacitors along the associated scan line. However, the pixel associated with the malfunctioned storage capacitor Cs cannot be lighted.

In addition, disconnection may also occur in the data lines 104 due to defects or notching occurred during the formation of the data lines 104 by patterning the second metal layer. When the disconnection of the data lines 104 occurs, the data lines 104 operate improperly. In the worst case, the entire rear plate of the LCD may be useless due to serious disconnection of the data lines 104. Conventionally, repair cannot be made directly on the rear plate where the disconnection of the data lines 104 occurs. To compensate for the problem due to the disconnection of the data lines 104, operations performed by a control circuit of the rear plate should be particularly designed. However, the control circuit can only be designed to perform compensating operations on a limited number of data lines disconnected. If an increased number of disconnected data lines are required, the cost of the control circuit for the requirement increases correspondingly.

SUMMARY OF THE INVENTION

It is therefore an object of the invention to provide a liquid crystal display (LCD) capable of being repaired for defects in data lines and storage capacitors of the LCD, and a method for repairing the same. According to the invention, at least two storage capacitors are employed in each pixel, a first and a second ring-type conductors are connected and formed between two adjacent scan lines and correspond to the data line associated with the pixel. The problems due to the defects in data lines and storage capacitors of the LCD can be resolved. In addition, the LCD has an increased yield and a reduced cost.

The invention achieves the above-identified object by providing a liquid crystal display capable of being repaired for defects in data lines. The liquid crystal display includes multiple scan lines, multiple data lines, multiple transparent pixel electrodes, multiple switching devices, multiple first storage capacitors, multiple second storage capacitors, multiple first ring-type conductors, and multiple second ring-type conductors. The data lines intersect the scan lines in perpendicular substantially while the scan lines and the data lines define a number of pixel regions, wherein each of the pixel regions is defined by a pair of the scan lines and a pair of the data lines. Each of the transparent pixel electrodes is disposed within the pixel regions respectively. The switching devices correspond to the pixel regions respectively, and each of the switching devices is connected to a corresponding one of the data lines and a corresponding one of the scan lines. Each of the first storage capacitors is disposed within one of the pixel regions, and includes a first capacitor electrode and a first common electrode. Each of the first capacitor electrodes is connected to a corresponding one of the transparent pixel electrodes. Each of the second storage capacitors is disposed within one of the pixel regions, and includes a second capacitor electrode and a second common electrode. Each of the second capacitor electrodes is connected to a corresponding one of the transparent pixel electrodes. Each of the first ring-type conductors is disposed between two adjacent scan lines of the scan lines and corresponds to one of the data lines. In addition, each of the first ring-type conductors is coupled to the first common electrode of two adjacent pixel regions of the pixel regions, and insulatingly intersects corresponding data lines at a first intersection and a second intersection in perpendicular substantially. Each of the second ring-type conductors is disposed between two adjacent scan lines of the scan lines, and corresponds to one of the data lines. In addition, each of the second ring-type conductors is coupled to the second common electrode of two adjacent pixel regions of the pixel regions, and insulatingly intersects corresponding data lines at a third intersection and a fourth intersection in perpendicular substantially.

The invention achieves the above-identified object by providing a method for repairing the liquid crystal display with defects in data lines. The method includes the following steps. First, when one of the data lines has a defect, the first ring-type conductor that surrounds the defect is selected. The first ring-type conductor that surrounds the defect is coupled to the data line at the first and second intersections corresponding to the data line and the first ring-type conductor that surrounds the defect. Next, a portion, between the first and second intersections corresponding to the data line and the first ring-type conductor that surrounds the defect, of the first ring-type conductor that surrounds the defect is isolated from the other portion thereof the first ring-type conductors other than the first ring-type conductor that surrounds the defect, and the second ring-type conductors.

The invention achieves the above-identified object by providing a method for repairing the liquid crystal display with defects in storage capacitors. The method includes the step of when one of the first storage capacitor has a defect, isolating the first common electrode of the first storage capacitor that has the defect from the first ring-type conductors and the second ring-type conductors.

Other objects, features, and advantages of the invention will become apparent from the following detailed description of the preferred but non-limiting embodiments. The following description of the invention is made with reference to accompanying drawings.

DETAILED DESCRIPTION OF THE INVENTION

Figure 1:
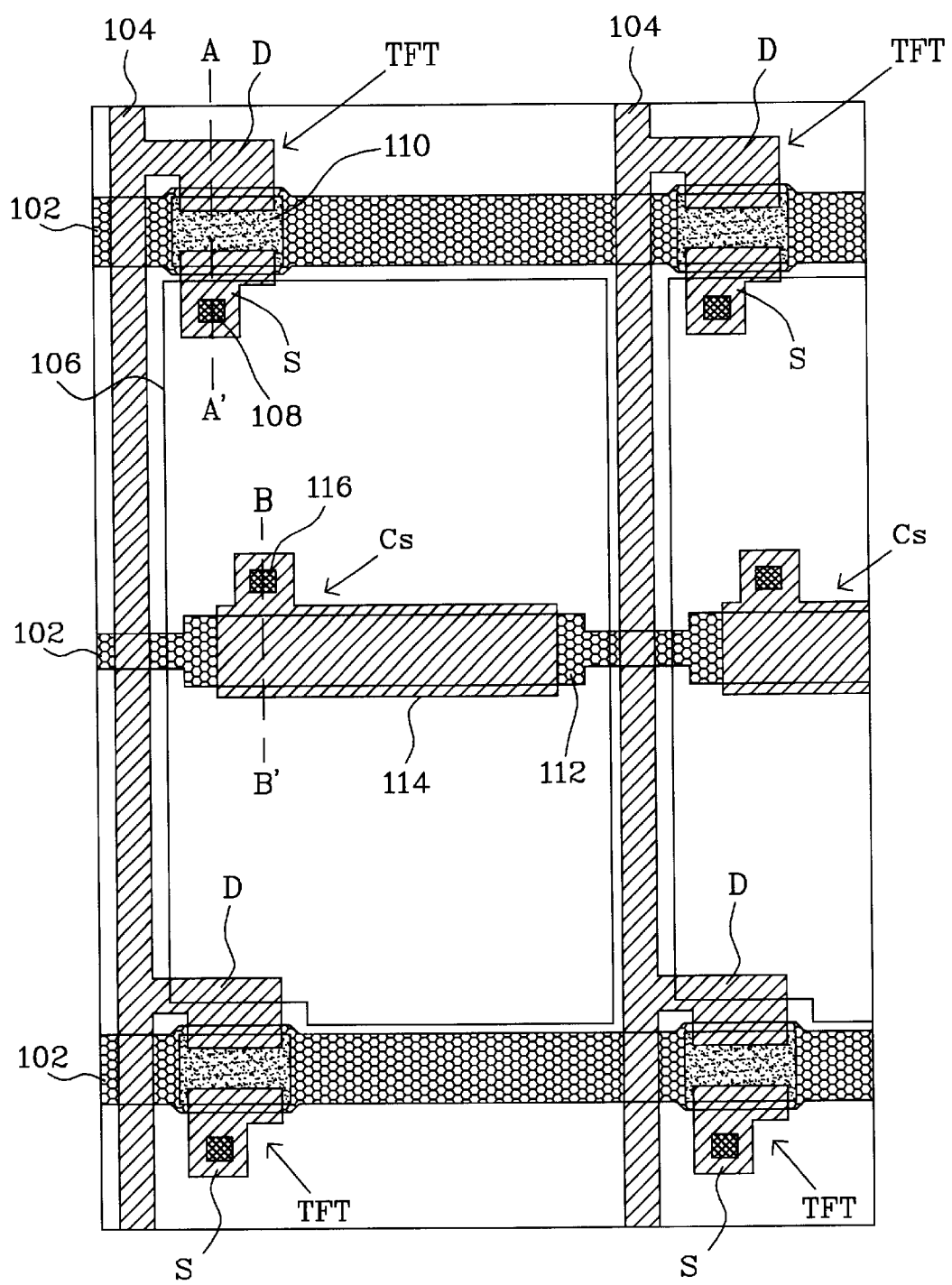
FIG. 1 (Prior Art) is a pixel layout of a conventional liquid crystal display.
Figure 2:
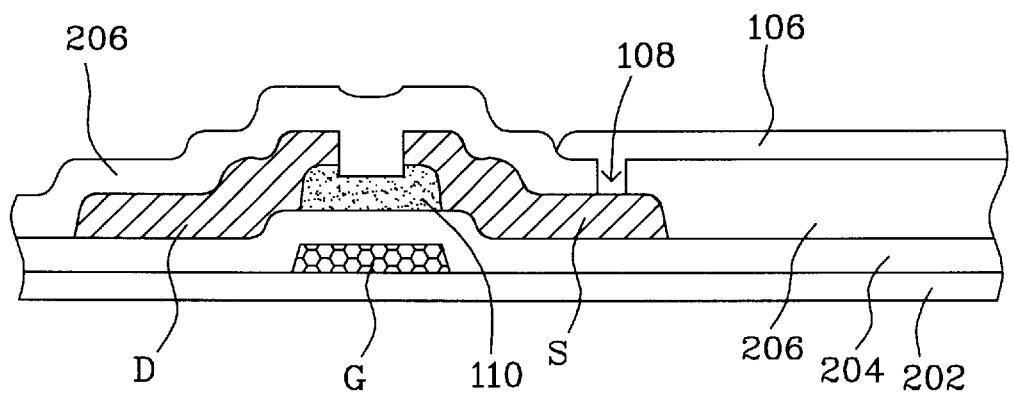
FIG. 2 (prior Art) is a cross-sectional view taken along line AA' of FIG. 1.
Figure 3:
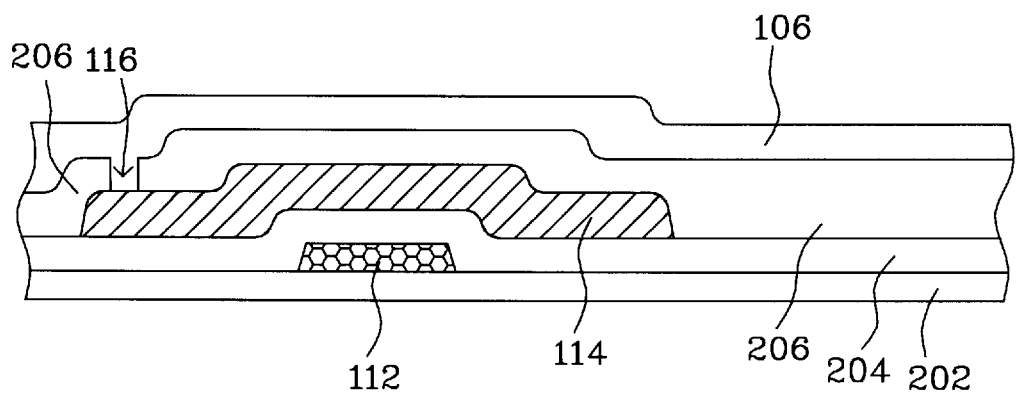
FIG. 3 (prior Art) is a cross-sectional view taken along line BB' of FIG. 1.
Figure 4A:
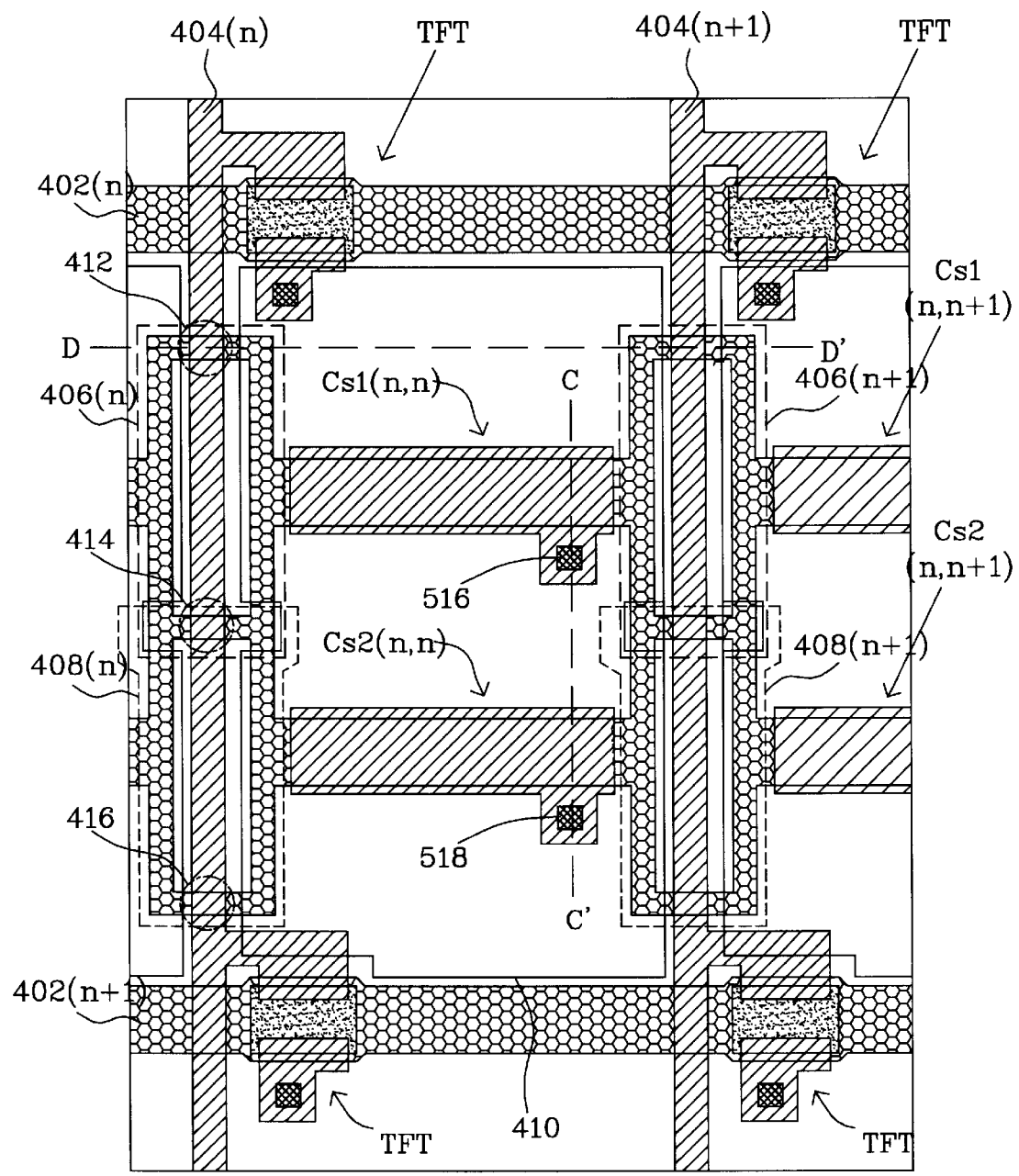
FIG. 4A is a pixel layout of a thin film transistor liquid crystal display (TFT-LCD) according to a preferred embodiment of the invention.

FIG. 4A is a pixel layout of a thin film transistor liquid crystal display (TFT-LCD) according to a preferred embodiment of the invention, wherein the pixel layout for one pixel and its adjacent pixels are shown. The TFT-LCD has multiple scan lines 402 and multiple data lines 404 which perpendicularly intersect the scan lines 402, for example, scan lines 402(n) and 402(n+1) intersecting data lines 404(n) and 404(n+1). In FIG. 4A, scan lines 402(n), 402(n+1), data lines 404(n), and 404(n+1) defines a pixel region p(n). Each pixel region includes two storage capacitors, a switching device, and a transparent pixel electrode. For example, the pixel region p(n) includes storage capacitor Cs1 (n, n), Cs2(n, n), a switching device such as a TFT, and a transparent pixel electrode 410.

For a data line intersecting two adjacent scan lines, two ring-type conductors are formed under the segment of the data line between the two scan lines, intersecting the segment of the data line at two intersections perpendicularly but insulatingly, and connect the storage capacitors on the two sides of the segment of the data line. For example, first and second ring-type conductors 406(n) and 408(n) are formed under the segment of the data line 404(n) between the scan lines 402(n) and 402(n+1), while first and second ring-type conductors 406(n+1) and 408(n+1) are formed under the segment of the data line 404(n+1) between the scan lines 402(n) and 402(n+1). In addition, the storage capacitor Cs1(n, n) connects the first ring-type conductors 406(n) and 406(n+1) while the storage capacitor Cs2(n, n) connects the second ring-type conductors 408(n) and 408(n+1).

The first and second ring-type conductors 406(n) and 408(n) can be ring-type rectangles. Besides, perpendicularly and insulatingly, the first ring-type conductor 406(n) intersects the data line 404(n) at intersections 412 and 414, while the second ring-type conductor 408(n) intersects the data line 408(n) at intersections 414 and 416. Although the first and second ring-type conductors 406(n) and 408(n) are illustrated along one segment in FIG. 4A, the illustration provides no limitation to implementations of the invention in practice.

Figure 5:
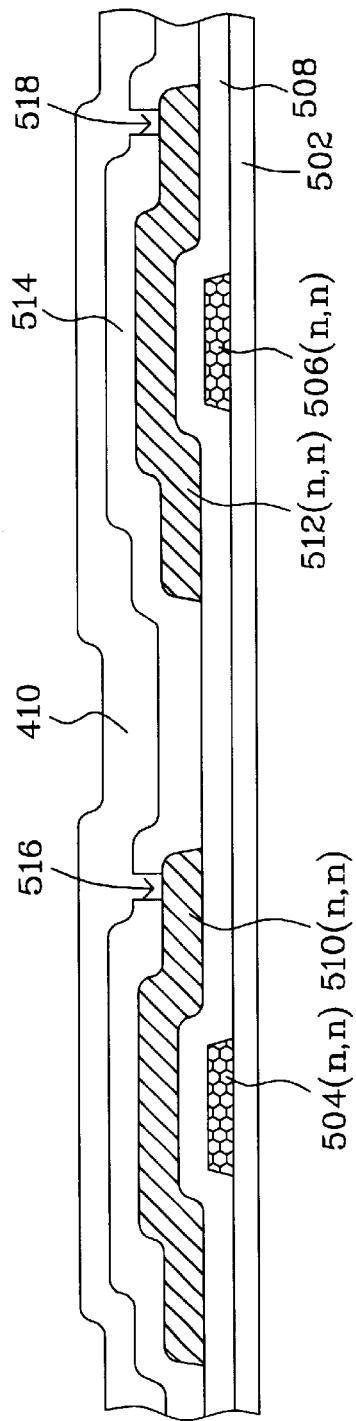
FIG. 5 is a cross-sectional view taken along line CC' of FIG. 4A.

FIG. 5 shows a cross-sectional view taken along a line CC' of the FIG. 4A. With reference to FIGS. 4A and 5, a process for manufacturing the storage capacitors Cs1(n, n) and Cs2(n, n) of the embodiment will be described as follows.

First, a first metal layer is formed on a plate 502 and then patterned to form common electrodes 504(n, n) and 506(n, n) of the storage capacitors Cs1(n, n) and Cs2(n, n) respectively. An isolation layer 508 is then formed over the common electrodes Cs1(n, n) and Cs2(n, n). Next, capacitor electrodes 510(n, n) and 512(n, n) of the respective storage capacitors Cs1(n, n) and Cs2(n, n) are formed. That is, a second metal layer is formed and then patterned to form the capacitor electrodes 510(n, n) and 512(n, n). A protection layer 514 is then disposed over the capacitor electrodes 510(n, n), 512(n, n), and portions of the isolation layer 508. Contacts 516 and 518 are formed in the protection layer 514, thus allowing the capacitor electrodes 510(n, n) and 512(n, n)to be exposed through the contacts 516 and 518. Finally, a transparent pixel electrode 410 is formed over the protection layer 514, and the transparent pixel electrode 410 is thus electrically coupled to the storage capacitors Cs1(n, n) and Cs2(n, n). In addition, the material of the isolation layer 508 is, for example, SiNx, while the material of the transparent pixel electrode 410 is, for example, indium tin oxide (ITO).

Figure 6:
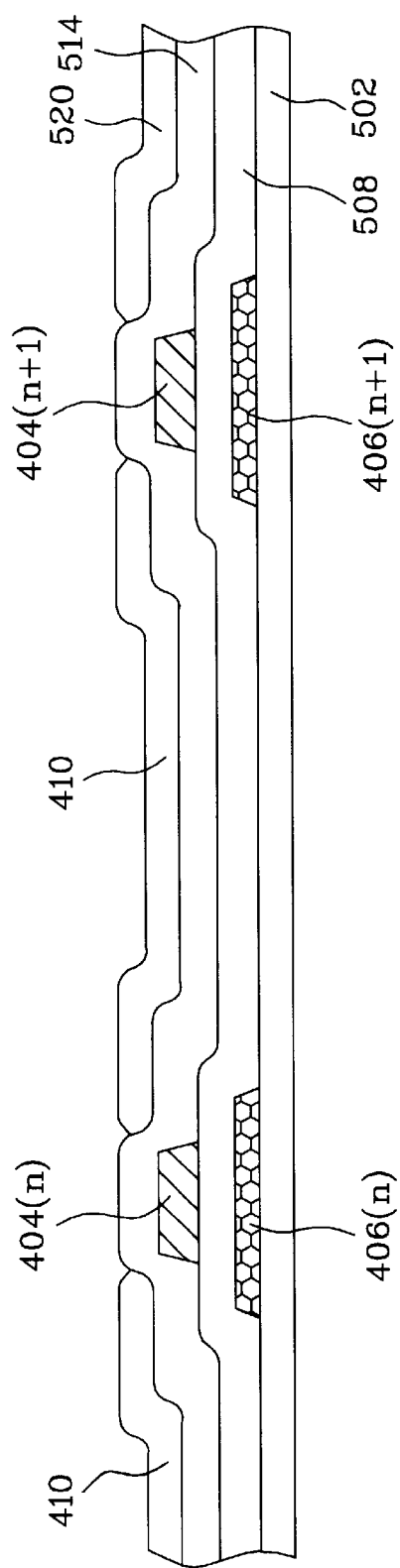
FIG. 6 is a cross-sectional view taken along line DD' of FIG. 4A.

FIG. 6 illustrates a cross-sectional view taken along the line DD' of FIG. 4A. With reference to FIGS. 4A, 5, and 6, the patterning of the first metal layer is employed to define the first and second ring-type conductors, for example, the first ring-type conductors 406(n) and 406(n+1). After that, the isolation layer 408is formed, covering the first ring-type conductors 406(n) and 406(n+1). Next, data lines, such as data lines 404(n) and 404(n+1) are formed on the isolation layer 508. Finally, the protection layer 514 is formed over the data lines and the transparent pixel electrode 410 is then formed on the protection layer 514.

In FIG. 4A, the storage capacitors Cs1(n, n) and Cs2(n, n) are connected in parallel and connected to the transparent pixel electrode 410 through the contacts 516 and 518 respectively. The storage capacitors are used for providing the corresponding liquid crystal cell a fixed voltage during a predetermined period of time. If one of the storage capacitors of a pixel region is failed, the other storage capacitor can still work for this purpose. Thus, the pixel can still operate correctly. Therefore, the problem of making the storage capacitors of the other pixel regions unable to work or making the corresponding pixel operate improperly due to the malfunctioned storage capacitor, as in the conventional approach, can be avoided.

Figure 4B:
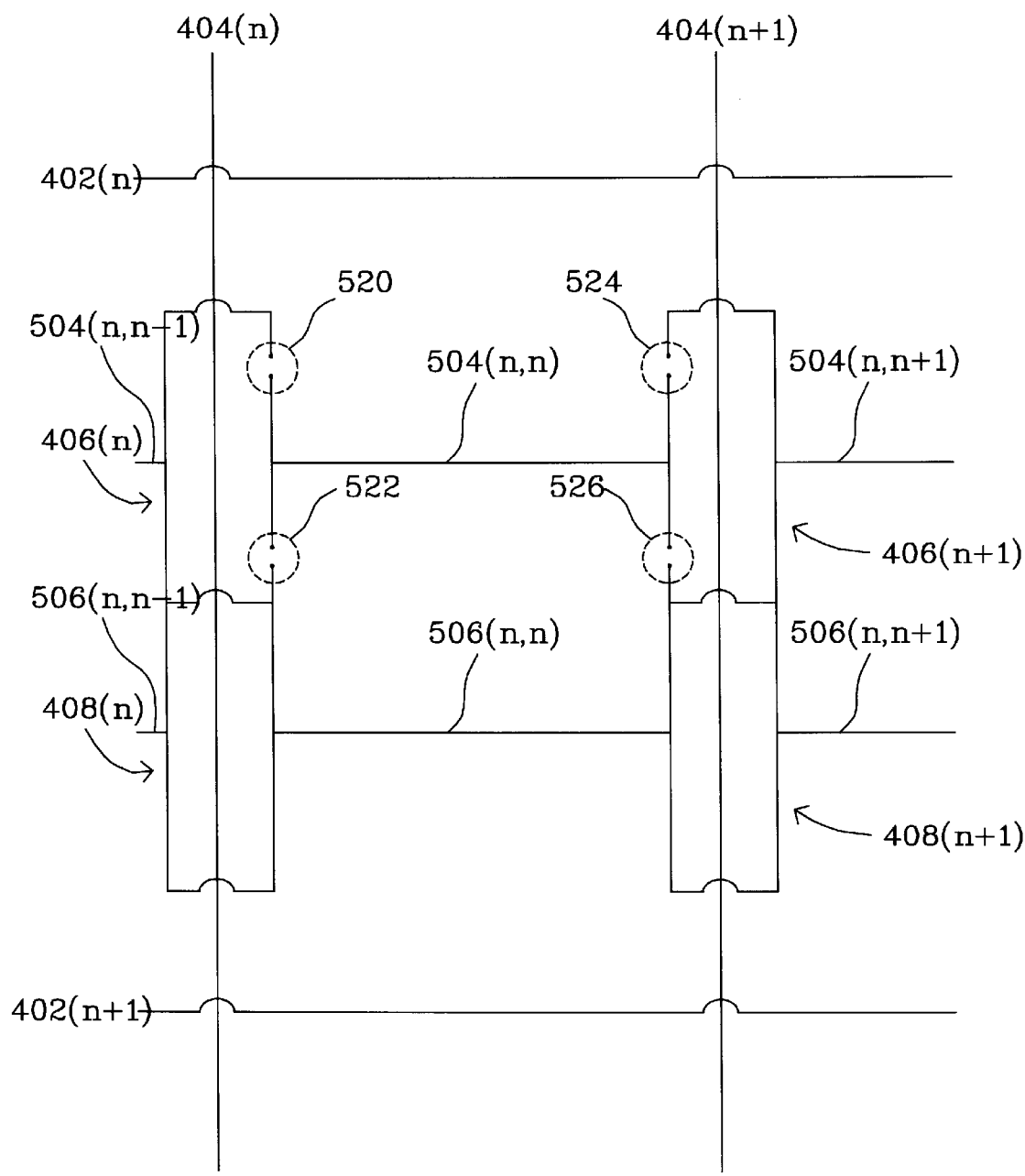
FIG. 4B shows the connection of storage capacitors and ring-type conductors in FIG. 4A.

FIG. 4B illustrates the repair of the circuitry, according to the invention, when the storage capacitor Cs1(n, n) in FIG. 4A malfunctions due to defects thereon. When the storage capacitor Cs1(n, n) cannot operate, the common electrode 504(n, n) of the storage capacitor Cs1(n, n) is to be isolated from the first ring-type conductors 406(n) and 406(n+1), e.g., by performing laser cutting at the locations 520, 522, 524, and 526. In this way, the common electrode 506(n, n) of the storage capacitor Cs2(n, n) still connects the first ring-type conductors 406(n) and 406(n+1), allowing signals transmitted through the common electrode 506(n, n). Therefore, although the common electrode 504(n, n) is cut off, the common electrode 504(n, n) of the storage capacitor Cs2(n, n) can still operate normally through its connection to the first ring-type conductor. In this case, the defects in the storage capacitor Cs1(n, n) cannot affect the operation of the storage capacitor Cs2(n, n), and the corresponding pixel has at least one operable storage capacitor to provide the corresponding liquid crystal cell a fixed voltage during a predetermined period of time.

Figure 7:
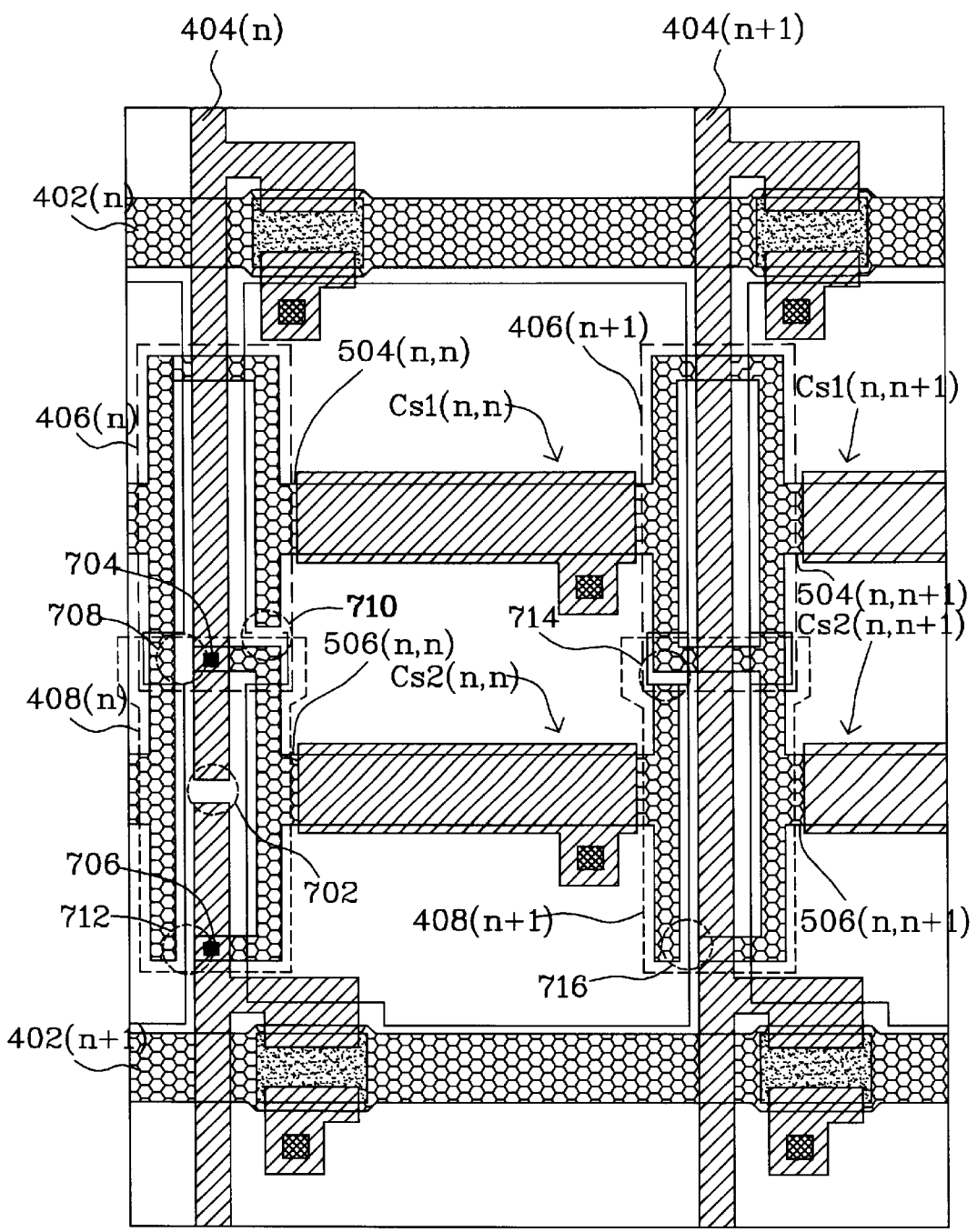
FIG. 7 is a pixel layout of the TFT-LCD after repair according to the invention, wherein the TFT-LCD is a TFT-LCD according to FIG. 4A and is supposed to have defects in its data lines.

FIG. 7 is a pixel layout for illustrating the repair method of the circuitry, according to the invention, when there are defects on the data lines in FIG. 4A, wherein a repaired pixel and its adjacent pixels are shown. When there are defects on the data lines, the data lines can be repaired according to the following method of the invention.

Suppose that there is a defect on one data line. A ring-type conductor that surrounds the defect is selected. The ring-type conductor that surrounds the defect is electrically coupled to the data line at two intersections of the data line and the ring-type conductor that surrounds the defect by, e.g., using laser welding, so that the data line and the ring-type conductor are short-circuited. Disconnection is performed by, e.g., laser cut, to isolate a portion, between the two intersections, of the ring-type conductor that surrounds the defect from the other portion thereof and the ring-type conductors (including such as first and second ring-type conductors) other than the ring-type conductor that surrounds the defect.

After the disconnection, the common electrode of the storage capacitor, connected to the portion of the ring-type conductor that surrounds the defect, is isolated from the common electrodes of the other storage capacitors. Thus, the ring-type conductor that surrounds the defect can be employed to compensate for the defect of the data line so that the data line is repaired and can operate normally.

FIG. 7 illustrates the repair of a defect 702 in the data line 404(n). First, as observed from FIG. 7, the ring-type conductor that surrounds the defect 702 is the second ring-type conductor 408(n). Thus, at the intersections of the data line 404(n) and the second ring-type conductor 408(n), i.e., the intersections 414 and 416, laser welding is performed, resulting in two welds 704 and 706. The data line 404(n) and the second ring-type conductor 408(n) are short-circuited. Next, laser cut is performed to isolate a portion, between the intersections 414 and 416, of the second ring-type conductor 408(n) (i.e., the portion connected to the storage capacitor Cs2(n, n)) from the other portion thereof and the ring-type conductors (including such as first and second ring-type conductors) other than the second ring-type conductor 408 (n). Thus, the second ring-type conductor 408(n) can be employed to compensate for the defect 702 of the data line 404(n).

After laser cut, the storage capacitor Cs2(n, n), connected to the portion of the second ring-type conductor 408(n), is isolated from the other storage capacitors, such as the storage capacitors Cs1(n, n), Cs2(n, n+1), Cs2(n, n−1), and so on.

Besides, the laser cut is performed at locations, such as locations 708, 710, 712, 714, and 716, so as to make corresponding conductors isolated. After the laser cut is performed on the first and second ring-type conductors 406(n) and 408(n) at the locations 708, 710, and 712 respectively, the common electrode 506(n, n) of the storage capacitor Cs2(n, n) is isolated from the common electrode 504(n, n) of the storage capacitor Cs1(n, n), the common electrode 506(n, n−1) of the storage capacitor Cs2(n, n−1) (not shown), and the common electrode 504(n, n−1) of the storage capacitor Cs1(n, n−1) (not shown). Due to the result of laser cut on the first and second ring-type conductors 406(n) and 408(n) at the locations 714 and 716 respectively, the common electrode 506(n, n) of the storage capacitor Cs2(n, n) is isolated from the common electrode 504(n, n) of the storage capacitor Cs1(n, n), the common electrode 506(n, n+1) of the storage capacitor Cs2(n, n+1), and the common electrode 504(n, n+1) of the storage capacitor Cs1(n, n+1). Thus, after laser cut, the storage capacitor Cs2(n, n) is isolated from all the other storage capacitors.

All of the storage capacitors are initially connected to a common voltage. When the storage capacitor Cs2(n, n) is isolated from all storage capacitors, the common electrode 506(n, n) of the storage capacitor Cs2(n, n) is no longer connected to the common voltage of the LCD. Thus, the portion of the second ring-type conductor 408(n) that is connected to the common electrode 506(n, n) of the storage capacitor Cs2(n, n) substitutes for the portion, between the intersections 704 and 706, of the data line 404(n). That is, the disconnection of the data line 404(n) due to the defect 702 in the data line 404(n) is effectively repaired so that the data line 404(n) can operate successfully.

In addition, on completion of the laser welding and cut described above, the common electrode 504(n, n) of the storage capacitor Cs1(n, n) is still connected to the common voltage through the first ring-type conductors 406(n) and 406(n+1), thus allowing the storage capacitor Cs1(n, n) to operate properly. In this case, the pixel with the storage capacitors Cs1(n, n) and Cs2(n, n) can still operable for display since at least one storage capacitor, i.e., Cs1(n, n), is operable.

Figure 8:
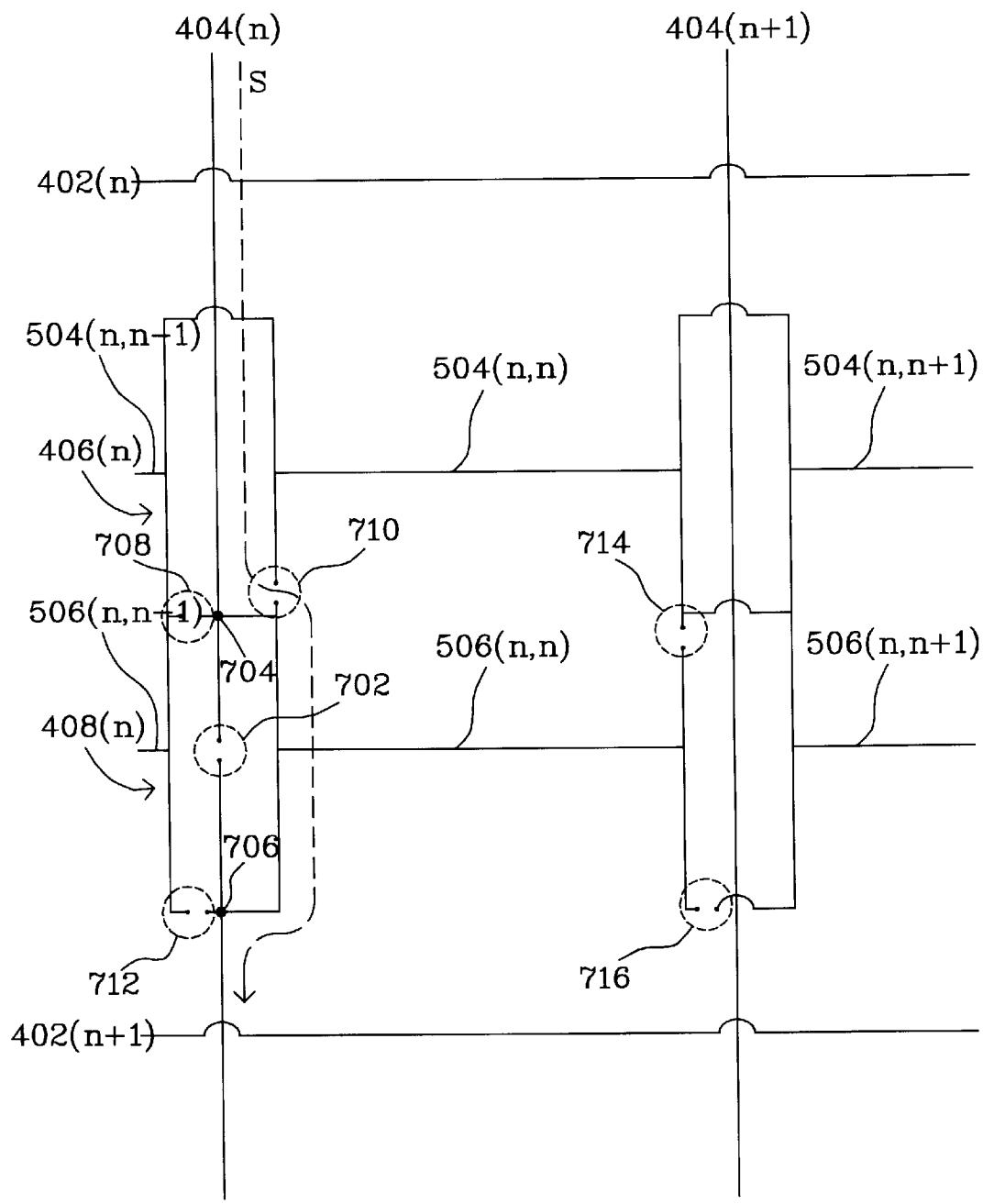
FIG. 8 shows the connection of storage capacitors and ring-type conductors in FIG. 7.

FIG. 8 is the circuitry showing the connection of the data lines and ring-type conductors shown in FIG. 7. On completion of the laser welding, the data line 404(n) and the second ring-type conductor 408(n) are electrically coupled at the welds 704 and 706. After laser cut, the portion, between the welds 704 and 706, of the second ring-type conductor 408(n) is disconnected and isolated from the other ring-type conductors. Thus, as a signal is transmitted through the data line 404(n), the signal path is traced as the arrow S shown in FIG. 8. In other words, the portion, between the welds 704 and 706, of the second ring-type conductor 408(n) compensates for the disconnection of the data line 404(n) due to the defect 702. By laser cut, the disconnection performed at the locations 708, 710, 712, 714, and 716 only disables the use of the storage capacitor Cs2(n, n), so the display can operate as normal.

Furthermore, during repairing the data line by the invention, the actions of coupling by laser welding and disconnecting by laser cut can be done in any order. That is, the repair to the data line can be done by either firstly performing laser welding and then laser cut, or firstly laser cut and then laser welding.

As disclosed in the embodiments above, the LCD with defects in its data lines is repairable. With a LCD according to the invention, the problems due to a malfunctioned storage capacitor or disconnection of a data line in the rear plate of the LCD can be resolved. In addition, since the ring-type conductors and the common electrodes of the storage capacitors are in the same structure layer, i.e., they can be manufactured at the same time, thus substantially not increasing the manufacturing cost. By using the structure of LCD and the method of repairing the LCD as defects of data lines or storage capacitors occurred on the LCD, the yield of the LCD products can be improved, thus reducing the total cost.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display capable of being repaired for defects in data lines, the liquid crystal display comprising:

a plurality of scan lines and a plurality of data lines intersecting the scan lines in perpendicular substantially, the scan lines and the data lines defining a plurality of pixel regions, each of the pixel regions being defined by a pair of the scan lines and a pair of the data lines;

a plurality of transparent pixel electrodes, each of the transparent pixel electrodes being disposed within the pixel regions respectively;

a plurality of switching devices corresponding to the pixel regions respectively, each of the switching devices being connected to a corresponding one of the data lines and a corresponding one of the scan lines;

a plurality of first storage capacitors, each of the first storage capacitors being disposed within one of the pixel regions, each of the first storage capacitors including a first capacitor electrode and a first common electrode, each of the first capacitor electrodes being electrically connected to a corresponding one of the transparent pixel electrodes;

a plurality of second storage capacitors, each of the second storage capacitors being disposed within one of the pixel regions, each of the second storage capacitors including a second capacitor electrode and a second common electrode, each of the second capacitor electrodes being electrically connected to a corresponding one of the transparent pixel electrodes;

a plurality of first ring-type conductors, each of the first ring-type conductors being disposed between two adjacent scan lines of the scan lines and corresponding to one of the data lines, each of the first ring-type conductors being coupled to the first common electrode of two adjacent pixel regions of the pixel regions, and insulatingly intersecting corresponding data lines at a first intersection and a second intersection in perpendicular substantially; and a plurality of second ring-type conductors, each of the second ring-type conductors being disposed between two adjacent scan lines of the scan lines and corresponding to one of the data lines, each of the second ring-type conductors being coupled to the second common electrode of two adjacent pixel regions of the pixel regions, and insulatingly intersecting corresponding data lines at a third intersection and a fourth intersection in perpendicular substantially.

2. A liquid crystal display as claimed in claim 1, wherein each of the second ring-type conductors is connected to a corresponding one of the first ring-type conductors.

3. A liquid crystal display as claimed in claim 1, wherein each of the second intersections is connected to a corresponding one of the third intersections.

4. A liquid crystal display as claimed in claim 1, wherein the first ring-type conductors and the second ring-type conductors and the first and second common electrodes are on a structure layer.

5. A liquid crystal display as claimed in claim 1, wherein the first ring-type conductors and the second ring-type conductors are ring-type rectangles.

6. A liquid crystal display as claimed in claim 1, wherein the switching devices are thin film transistors.

7. A method for repairing a liquid crystal display with defects in data lines, the liquid crystal display comprising:
  a plurality of scan lines and a plurality of data lines, the scan lines intersecting the data lines so as to define a plurality of pixel regions, each of the pixel regions being defined by a pair of the scan lines and a pair of the data lines;
  a plurality of first storage capacitors and a plurality of second storage capacitors, each of the first storage capacitors being disposed within one of the pixel regions, each of the first storage capacitors including a first common electrode, each of the second storage capacitors including a second common electrode; and
  a plurality of first ring-type conductors and a plurality of second ring-type conductors, each of the first ring-type conductors and each of the second ring-type conductors being disposed between two adjacent scan lines of the scan lines, wherein each of the first ring-type conductors is coupled to the first common electrode of two corresponding adjacent pixel regions of the pixel regions, and insulatingly intersects corresponding data lines at a first intersection and a second intersection in perpendicular substantially, each of the second ring-type conductors is coupled to the second common electrode of two corresponding adjacent pixel regions of the pixel regions, and insulatingly intersects corresponding data lines at a third intersection and a fourth intersection in perpendicular substantially;
  the method comprising the steps of:
    when one of the data lines has a defect, selecting the first ring-type conductor that surrounds the defect;
    coupling the first ring-type conductor that surrounds the defect to the data line at the first and second intersections corresponding to the data line and the first ring-type conductor that surrounds the defect; and
    isolating a portion, between the first and second intersections corresponding to the data line and the first ring-type conductor that surrounds the defect, of the first ring-type conductor that surrounds the defect from the other portion thereof, the first ring-type conductors other than the first ring-type conductor that surrounds the defect, and the second ring-type conductors.

8. A method as claimed in claim 7, further comprising the step of:
  isolating the first common electrode of one of the first storage capacitors connected to the portion of the first ring-type conductor that surrounds the defect from the first common electrodes of the other first storage capacitors, and the second common electrodes of the second storage capacitors.

9. A method as claimed in claim 7, wherein each of the second ring-type conductors is connected to a corresponding one of the first ring-type conductors.

10. A method as claimed in claim 7, wherein each of the second intersections is connected to a corresponding one of the third intersections.

11. A method as claimed in claim 7, wherein the first ring-type conductors and the second ring-type conductors and the first and second common electrodes are disposed on a structure layer.

12. A method as claimed in claim 7, wherein the coupling step comprises performing laser welding.

13. A method as claimed in claim 7, wherein the isolating step comprises performing laser cut.

14. A method of repairing a liquid crystal display with defects in storage capacitors, the liquid crystal display comprising:
  a plurality of scan lines and a plurality of data lines, the scan lines intersecting the data lines in perpendicular substantially so as to define a plurality of pixel regions, each of the pixel regions being defined by a pair of the scan lines and a pair of the data lines;
  a plurality of first storage capacitors and a plurality of second storage capacitors, each of the first storage capacitors being disposed within one of the pixel regions, each of the first storage capacitors including a first common electrode, each of the second storage capacitors including a second common electrode; and
  a plurality of first ring-type conductors and a plurality of second ring-type conductors, each of the first ring-type conductors and each of the second ring-type conductors being disposed between two adjacent scan lines of the scan lines, wherein each of the first ring-type conductors is coupled to the first common electrode of two corresponding adjacent pixel regions of the pixel regions, and insulatingly intersects corresponding data lines at a first intersection and a second intersection in perpendicular substantially, each of the second ring-type conductors is coupled to the second common electrode of two corresponding adjacent pixel regions of the pixel regions, and insulatingly intersects corresponding data lines at a third intersection and a fourth intersection in perpendicular substantially;
  the method comprising the step of:
    when one of the first storage capacitor has a defect, isolating the first common electrode of the first storage capacitor that has the defect from the first ring-type conductors and the second ring-type conductors.

15. A method as claimed in claim 14, wherein each of the second ring-type conductors is connected to a corresponding one of the first ring-type conductors.

16. A method as claimed in claim 14, wherein each of the second intersections is connected to a corresponding one of the third intersections.

17. A method as claimed in claim 14, wherein the first ring-type conductors and the second ring-type conductors and the first and second common electrodes are disposed on a structure layer.

* * * * *